United States Patent
Ebata

(10) Patent No.: US 11,949,981 B2
(45) Date of Patent: Apr. 2, 2024

(54) DISPLAY DEVICE, METHOD FOR CONTROLLING DISPLAY DEVICE, AND NON-TRANSITORY COMPUTER READABLE MEDIUM FOR REDUCING POWER CONSUMPTION RELATING TO IMAGE DISPLAY

(71) Applicant: CANON KABUSHIKI KAISHA, Tokyo (JP)

(72) Inventor: Yuya Ebata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/833,710

(22) Filed: Jun. 6, 2022

(65) Prior Publication Data
US 2022/0394187 A1 Dec. 8, 2022

(30) Foreign Application Priority Data
Jun. 8, 2021 (JP) .................. 2021-096150

(51) Int. Cl.
*H04N 23/65* (2023.01)
*G06T 7/70* (2017.01)
*H04N 23/61* (2023.01)
*H04N 23/63* (2023.01)

(52) U.S. Cl.
CPC ............ *H04N 23/651* (2023.01); *G06T 7/70* (2017.01); *H04N 23/61* (2023.01); *H04N 23/63* (2023.01); *G06T 2207/30201* (2013.01)

(58) Field of Classification Search
CPC ...... H04N 23/651; H04N 23/61; H04N 23/63; H04N 23/71; H04N 23/56; H04N 23/611; H04N 23/663; H04N 23/74; G06T 7/70; G06T 2207/30201

USPC ...................................................... 348/333.13
See application file for complete search history.

(56) References Cited

U.S. PATENT DOCUMENTS

| | | | |
|---|---|---|---|
| 2005/0060670 A1* | 3/2005 | Inui ....................... | G06F 1/3215 715/767 |
| 2009/0128540 A1* | 5/2009 | Hsu ....................... | G09G 3/3611 345/213 |
| 2012/0242570 A1* | 9/2012 | Kobayashi ........... | G02B 27/0093 345/156 |
| 2014/0215250 A1* | 7/2014 | Chen .................... | G06F 1/3231 713/323 |
| 2014/0333748 A1* | 11/2014 | Kim ..................... | H04N 23/6812 348/78 |

(Continued)

FOREIGN PATENT DOCUMENTS

| | | |
|---|---|---|
| JP | 2012-073876 A | 4/2012 |
| JP | 2013-162407 A | 8/2013 |

*Primary Examiner* — Usman A Khan
(74) *Attorney, Agent, or Firm* — Canon U.S.A., Inc. IP Division

(57) ABSTRACT

A display device according to one embodiment of the present disclosure acquires time series images; processes the acquired images; performs control so that a processed image is displayed on a display; detects a closed state of an eyelid of a user; and starts power saving processing to reduce power consumption of the image processing or the displaying, in response to the detection of the closed state of the eyelid, and instructs restart of processing that was being performed before the power saving processing, in the image processing or the displaying, at a timing when a specific time has elapsed from the detection of the closed state of the eyelid.

16 Claims, 10 Drawing Sheets

(56) References Cited

U.S. PATENT DOCUMENTS

2016/0227113 A1\* 8/2016 Horesh ................ H04N 23/611
2020/0238825 A1\* 7/2020 Lerzer ..................... G06F 3/013

\* cited by examiner

X AXIS DIRECTION

Y AXIS DIRECTION

Z AXIS DIRECTION

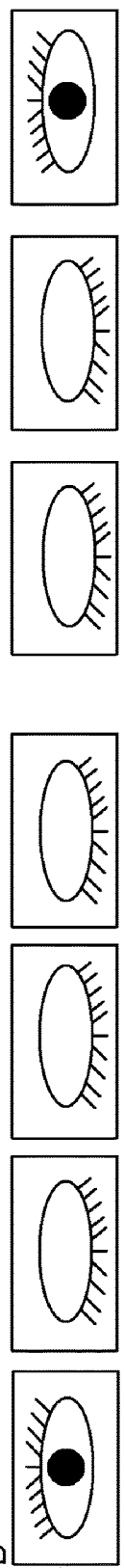
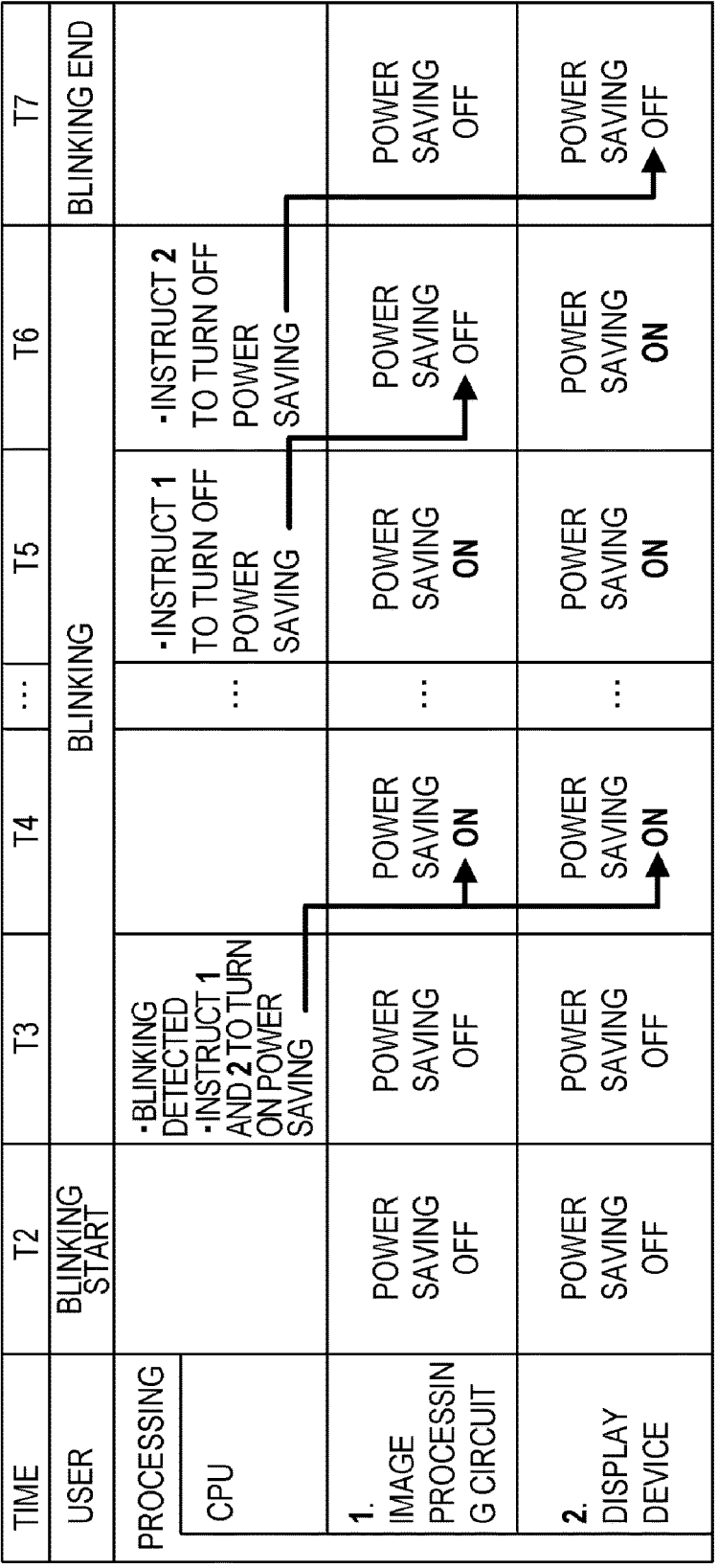
FIG. 9A
FIG. 9B
FIG. 9C

DISPLAY DEVICE, METHOD FOR CONTROLLING DISPLAY DEVICE, AND NON-TRANSITORY COMPUTER READABLE MEDIUM FOR REDUCING POWER CONSUMPTION RELATING TO IMAGE DISPLAY

BACKGROUND

Technical Field

The present disclosure relates to a display device, a method for controlling the display device, and a non-transitory computer readable medium.

Description of the Related Art

In recent years, an imaging apparatus (e.g. a digital camera) captures an image after the user confirms an object by a live view (hereafter LV) display on a display unit, such as a rear monitor and an electronic view finder (EVF). A problem of LV image capturing is that power consumption increases because of the display on the rear monitor and the EVE Japanese Patent Application Publication No. 2013-162407 proposes a power saving processing method where blinking is detected by sensing the temperature of the eyes when the eye is opened or closed, using a far infrared sensor, and the screen display is turned OFF during blinking so as to reduce power consumption.

In Japanese Patent Application Publication No. 2013-162407, the screen display is turned ON at a timing of detecting the end of blinking (opening of eyelid). However, there is a time lag between the detection of the end of blinking and reflecting the processing on the screen display, hence a black image may be displayed at the timing when the user opens their eyes, and the screen may thus appear as flickering to the user.

SUMMARY

With the foregoing in view, various embodiments of the present disclosure reduce power consumption during blinking, while reducing flickering of the display image.

According to a first embodiment of the present disclosure, a display device is provided that includes at least one memory and at least one processor which function as: an image acquiring unit configured to acquire time series images; an image processing unit configured to process the images acquired by the image acquiring unit; a display control unit configured to perform control so that a processed image processed by the image processing unit is displayed on a display; a detecting unit configured to detect a closed state of an eyelid of a user; and a control unit configured to start power saving processing to reduce power consumption of the image processing unit or the display, in response to the detection of the closed state of the eyelid by the detecting unit, and instruct restart of processing that was being performed before the power saving processing, in the image processing unit or the display, at a timing when a specific time has elapsed from the detection of the closed state of the eyelid.

According to a second embodiment of the present disclosure, a control method of a display device is provided that includes: acquiring time series images; processing an acquired image; performing control so that a processed image is displayed on a display; detecting a closed state of an eyelid of a user; starting power saving processing to reduce power consumption of the processing or the display, in response to the detection of the closed state of the eyelid by detecting processing; and instructing restart of processing that was being performed before the power saving processing, in the processing or the display, at a timing when a specific time has elapsed from the detection of the closed state of the eyelid.

According to a third embodiment of the present disclosure, a non-transitory computer readable medium is provided that stores a program, wherein the program causes a computer to execute a control method of a display device, the control method including: acquiring time series images; processing an acquired image; performing control so that a processed image is displayed on a display; detecting a closed state of an eyelid of a user; starting power saving processing to reduce power consumption of the processing or the display, in response to the detection of the closed state of the eyelid by detecting processing; and instructing restart of processing that was being performed before the power saving processing, in the processing or the display, at a timing when a specific time has elapsed from the detection of the closed state of the eyelid.

Further features of the present disclosure will become apparent from the following description of example embodiments with reference to the attached drawings.

BRIEF DESCRIPTION OF THE DRAWINGS

FIG. 9A indicates LV images during the blinking power saving time according to Embodiment 1, FIG. 9B indicates eye images during the blinking power saving time according to Embodiment 1, and FIG. 9C is a chart indicating a state of the eyelid of the user and processing content of the camera at each timing during the blinking power saving time according to Embodiment 1.

DESCRIPTION OF THE EMBODIMENTS

Embodiment 1

Example embodiments of the present disclosure will be described with reference to the accompanying drawings using a digital still camera as an example apparatus. The present embodiment, however, is not limited to use of a digital still camera, but may be applicable to other devices including, for example, a digital video camera, a head mounted display, a spectacle type display, and the like.

Description of Configuration

Figure 1:
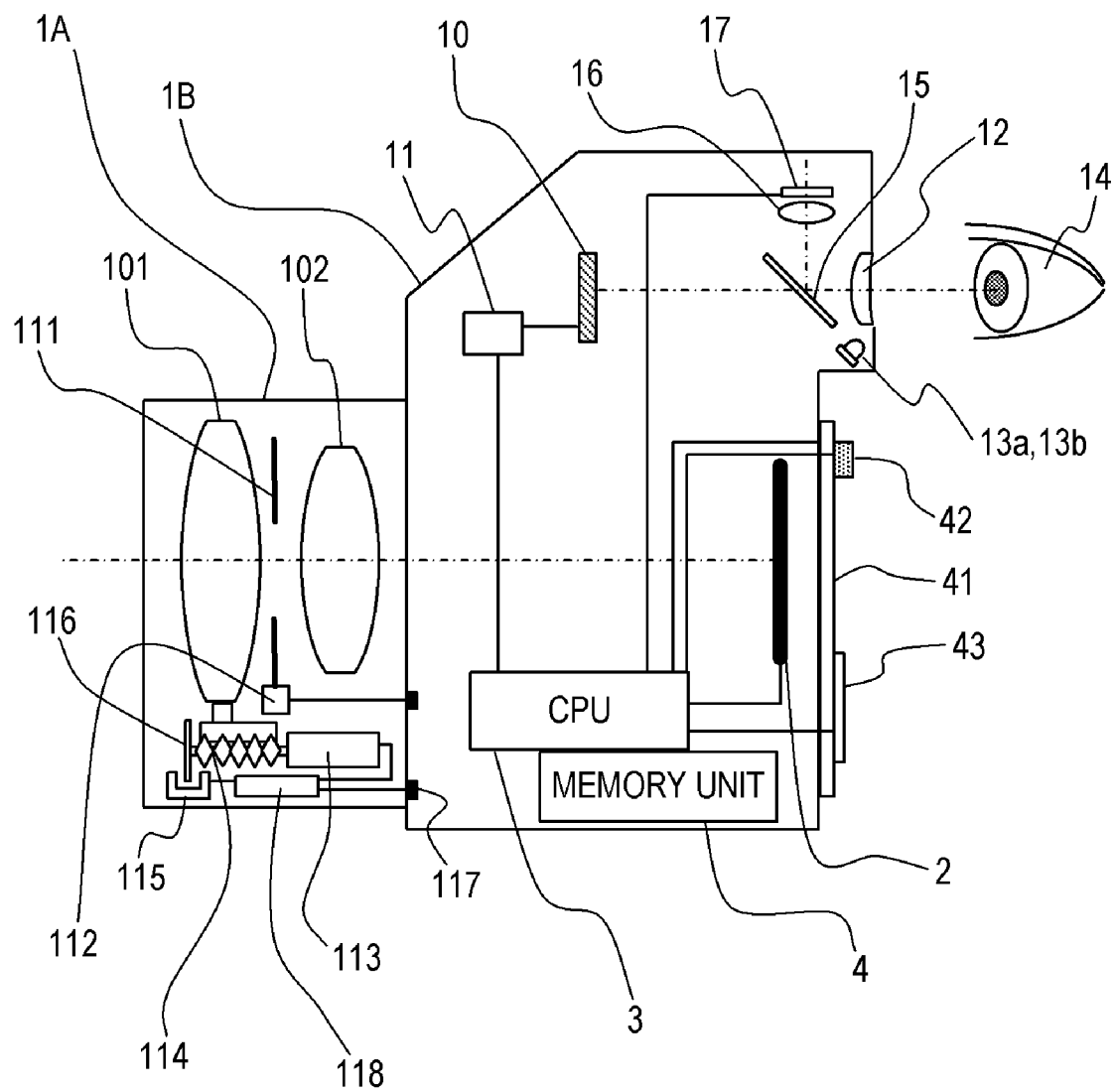
FIG. 1 is a cross-sectional view of a camera according to Embodiment 1.
Figure 1:
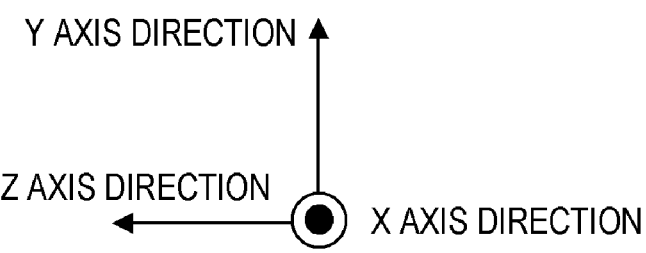
Figure 2A:
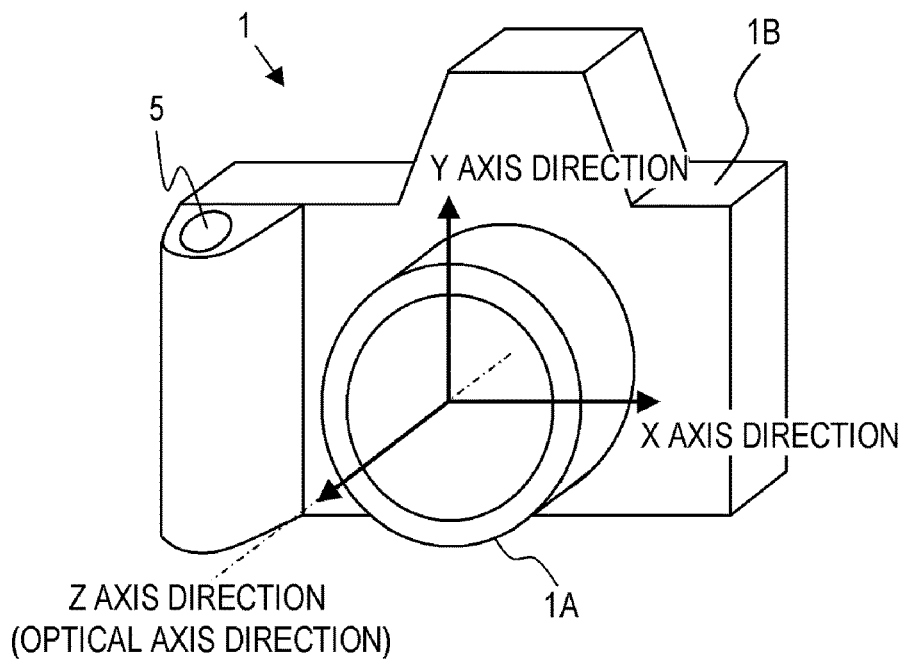
FIGS. 2A and 2B are external views of the camera according to Embodiment 1.
Figure 2B:
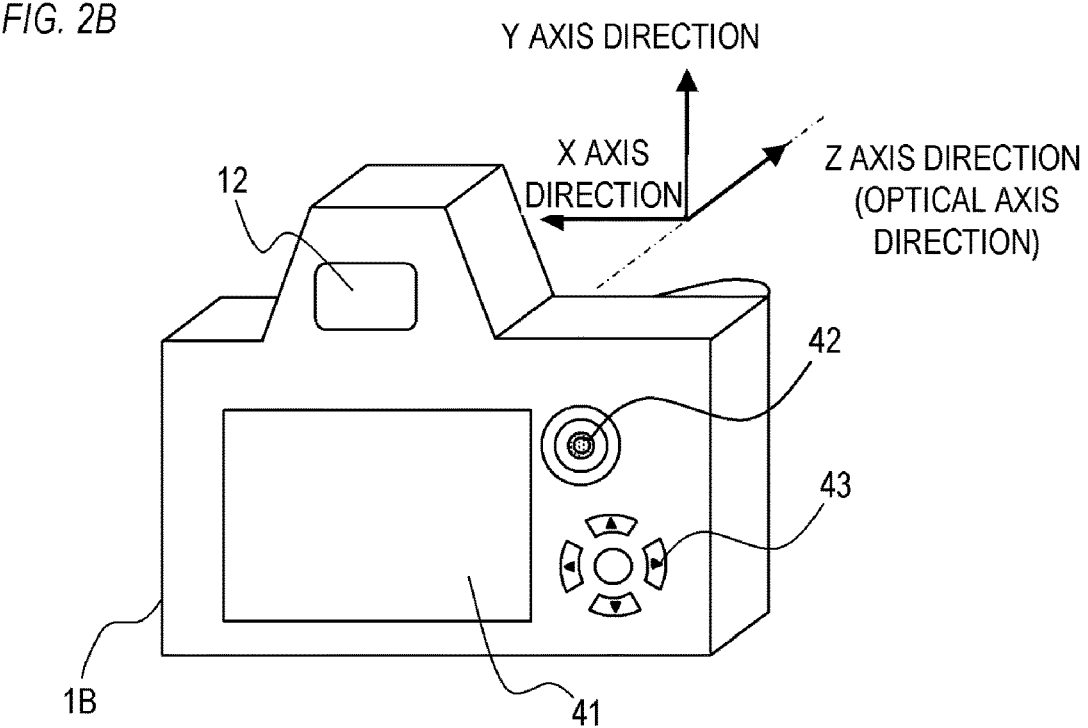

FIG. 1 is a cross-sectional view when a camera enclosure is sectioned at a YZ plane formed by a Y axis and a Z axis indicated in FIG. 2A, and is a diagram for describing a general configuration of the digital still camera 1 according to various embodiments of the present disclosure. In FIGS. 1, 2A and 2B, a same composing element is denoted with a same reference number.

An image capturing lens unit 1A includes two lenses 101 and 102, an aperture 111, an aperture driving unit 112, a lens driving motor 113, a lens driving member 114, a photocoupler 115, a pulse plate 116, a mount contact 117, a focus adjusting circuit 118, and the like. In the present embodiment, two lenses 101 and 102 are indicated to simplify description, but more than two lenses are actually included in the image capturing lens unit 1A. The lens driving member 114 is constituted of a driving gear and the like, and the photocoupler 115 detects the rotation of the pulse plate 116, which interlocks with the lens driving member 114, and transfers the rotation to the focus adjusting circuit 118. The focus adjusting circuit 118 drives the lens driving motor 113 based on information from the photocoupler 115 and information from the camera enclosure 1B (information on a lens driving amount), and moves the lens 101 to change the focus position. The mount contact 117 is an interface between the image capturing lens unit 1A and the camera enclosure 1B.

The camera enclosure 1B includes an image pickup element 2, a CPU 3, a memory unit 4, a display device 10 (display unit), a display device driving circuit 11, and the like. The image pickup element 2 (image acquiring unit; imaging unit) is disposed on an image forming plane of the image capturing lens unit 1A. The CPU 3 is a central processing unit of a microcomputer, and controls the digital still camera 1 in general. The memory unit 4 stores time series images and the like, captured by the image pickup element 2. The display device 10 is constituted of liquid crystals or the like, and display a captured image (object image) or the like on the display surface of the display device 10. The display device driving circuit 11 drives the display device 10. The user can view the display surface of the display device 10 via an eyepiece 12.

The camera enclosure 1B also includes light sources 13a and 13b, a light divider 15, a light-receiving lens 16, an eyeball image pickup element 17, and the like. The light sources 13a and 13b are light sources which have conventionally been used in single-lens reflex cameras and the like, to detect the line-of-sight (gaze) direction based on the relationship between a reflex image (corneal reflex image: Purkinje image), formed by the corneal reflex of the light, and a pupil, and are light sources to illuminate an eyeball 14 of the user. Specifically, the light sources 13a and 13b are infrared light-emitting diodes which emit infrared light (invisible) to the user, for example, and are disposed around the eyepiece 12. An optical image of the illuminated eyeball 14 (eyeball image: image formed by the reflected light, which was emitted from the light sources 13a and 13b and reflected on the eyeball 14) transmits through the eyepiece 12 and is reflected by the light divider 15. Then the eyeball image is formed on the eyeball image pickup element 17, in which rows of photoelectric elements (e.g. CMOS) are disposed two-dimensionally, by the light-receiving lens 16. The light-receiving lens 16 is located so that the pupil of the eyeball 14 and the eyeball image pickup element 17 are in a conjugate image forming relationship. By the later mentioned predetermined algorithm, the line-of-sight direction of the eyeball 14 (a viewpoint (viewpoint position; line-of-sight position; gaze position) on the display surface of the display device 10) is detected based on the position of the corneal reflex image in the eyeball image formed on the eyeball image pickup element 17.

Figure 2C:
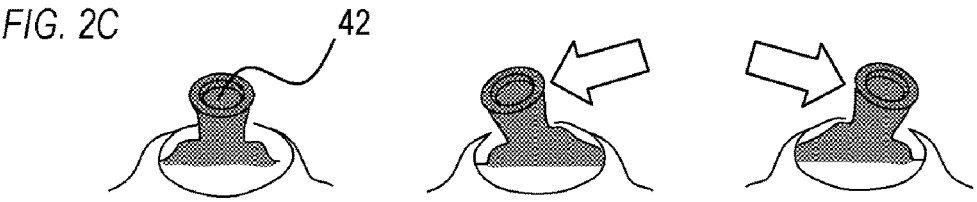
FIG. 2C is a diagram depicting a control lever.

FIGS. 2A and 2B are external views of a digital still camera 1 according to various embodiments of the present disclosure. FIG. 2A is a front perspective view and FIG. 2B is a rear perspective view. As illustrated in the front perspective view in FIG. 2A, the digital still camera 1 in the present embodiment is constituted of the image capturing lens unit 1A and the camera enclosure 1B. On the camera enclosure 1B, a release button 5, which is an operation member that receives imaging operations instructed by the user (photographer), is disposed. Further, as illustrated in the rear perspective view in FIG. 2B, on the rear face of the camera enclosure 1B, the eyepiece 12 (ocular optical system), for the user to look into the display device 10 (display panel) included in the camera enclosure 1B, is disposed. The ocular optical system may include a plurality of lenses. On the rear face of the camera enclosure 1B, operation members 41 to 43, which receive various operations instructed by the user, are also disposed. For example, the operation member 41 is a touch panel to receive a touch operation. The operation member 41 also includes a display panel (e.g. liquid crystal panel) and has a function to display an image on the display panel. The operation member 42 is a control that can be pushed in various directions as illustrated in FIG. 2C. The operation member 43 is a four-direction key (button type cross key) which can be pushed in each of four directions.

Figure 3:
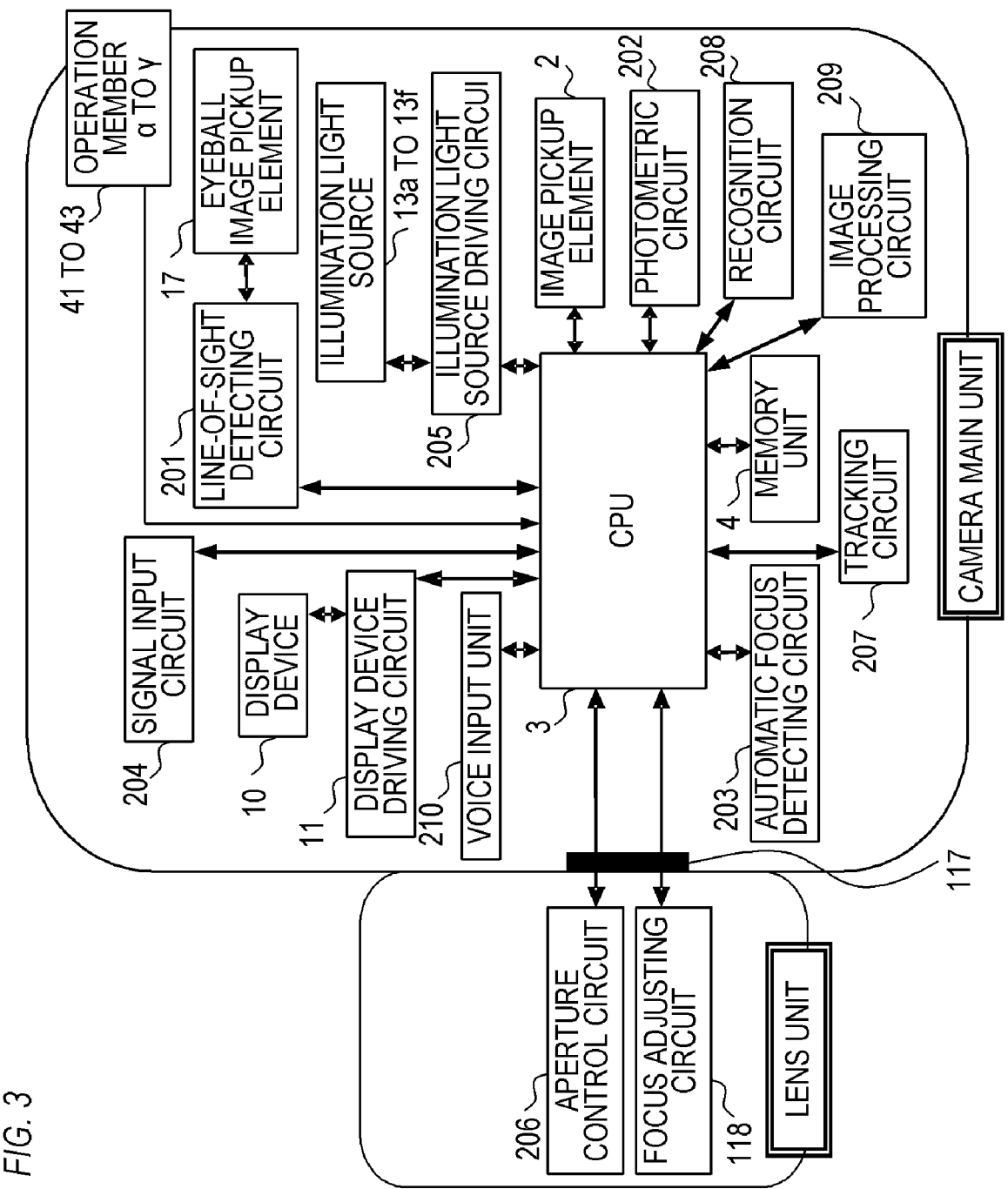
FIG. 3 is a block diagram of the camera according to Embodiment 1.

FIG. 3 is a block diagram depicting an electric configuration included in the digital still camera having the configuration illustrated in FIG. 3, and a composing element the same as FIG. 1 is denoted with a same reference number. A line-of-sight detecting circuit 201, a photometric circuit 202, an automatic focus detecting circuit 203, a signal input circuit 204, the display device driving circuit 11, an illumination light source driving circuit 205, a tracking circuit 207, a recognition circuit 208, an image processing circuit 209, and a voice input unit 210 are connected to the CPU 3. The CPU 3 also transfers signals, via the mount contact 117, to the focus adjusting circuit 118 disposed in the image capturing lens unit 1A and an aperture control circuit 206 included in the aperture driving unit 112 in the image capturing lens unit 1A. The memory unit 4 attached to the CPU 3 has a function to record imaging signals from the image pickup element 2 and the eyeball image pickup element 17, and a function to record line-of-sight correction data for correcting individual differences of the lines-of-sight, which will be described later.

The line-of-sight detecting circuit 201 performs A/D conversion on the output from the eyeball image pickup element 17 (CCD-EYE) when the eyeball image is formed, and sends this image information to the CPU 3. The CPU 3 (line-of-sight detecting unit) extracts each characteristic point of the eyeball image required for detecting the line-of-sight, in accordance with a later mentioned predetermined algorithm, and then detects the viewpoint position (line-of-sight) of the user based on the position of each characteristic point.

The photometric circuit 202 performs amplification, logarithmic compression and A/D conversion on the brightness signal output corresponding to the brightness of the field, based on the signals acquired from the image pickup element 2 which also plays a role of the photometric sensor, and sends the result to the CPU 3 as the field brightness information.

The automatic focus detecting circuit 203 performs A/D conversion on the signal voltage from a plurality of pixels included in the CCD of the image pickup element 2 used for phase difference detection, and sends the result to the CPU 3. The CPU 3 computes the distance to the object, which corresponds to each focus detecting point, based on the signals of the plurality of pixels. This is a technique publicly known as an imaging plane phase difference AF. In the present embodiment, it is assumed, as an example, that 180 focus detecting points exist on the imaging plane corresponding to the locations indicated in the visual field image in the finder in FIG. 4A.

A switch SW1, which turns on by the first stroke of the release button 5, so as to start the photometry, distance measurement, line-of-sight detecting operation or the like of the digital still camera 1, is connected to the signal input circuit 204. Further, a switch SW2, which turns ON by the second stroke of the release button 5, so as to start the photographing operation, is connected to the signal input circuit 204. The ON signals from the switches SW1 and SW2 are inputted to the signal input circuit 204 and are sent to the CPU 3. The operation signals from the above mentioned operation members 41 to 43 are configured to be transferred to the CPU 3, and the later mentioned operation control to move an estimated gaze point frame position, for example, is performed in accordance with the operation signals of the operation members 41 to 43.

The tracking circuit 207 is a circuit to which an image is inputted and which tracks the object based on the control of the CPU 3, and sends information on a tracking frame of the image information to the CPU 3. The tracking processing is performed by determining the similarities of two images based on the sum of the absolute difference (SAD), for example. A tracking processing other than SAD may be used for the tracking circuit 207.

The recognition circuit 208 is a circuit to recognize an object in an input image, and detects a face of a person or detects an animal, for example.

The image processing circuit 209 (image processing unit) is constituted of various image processing units, a buffer memory, and the like, and performs appropriate processing on the acquired image data, such as correction of chromatic aberration of magnification, developing processing, noise reduction processing, geometric transformation, and resizing (e.g. magnification/demagnification). The image processing circuit 209 also includes a correction unit which performs appropriate correction on the image data, such as pixel correction, black level correction, shading correction and scratch correction. The processed image, which was processed by the image processing circuit 209, is displayed by the display device 10.

The voice input unit 210 acquires sound from a built-in microphone or a voice input device connected via a voice input terminal, and sends the acquired sound to the CPU 3. The CPU 3 selects inputted voice signals as required, performs analog/digital conversion, level optimization processing, processing to reduce specific frequencies, and the like, so as to generate voice signals.

Figure 4A:
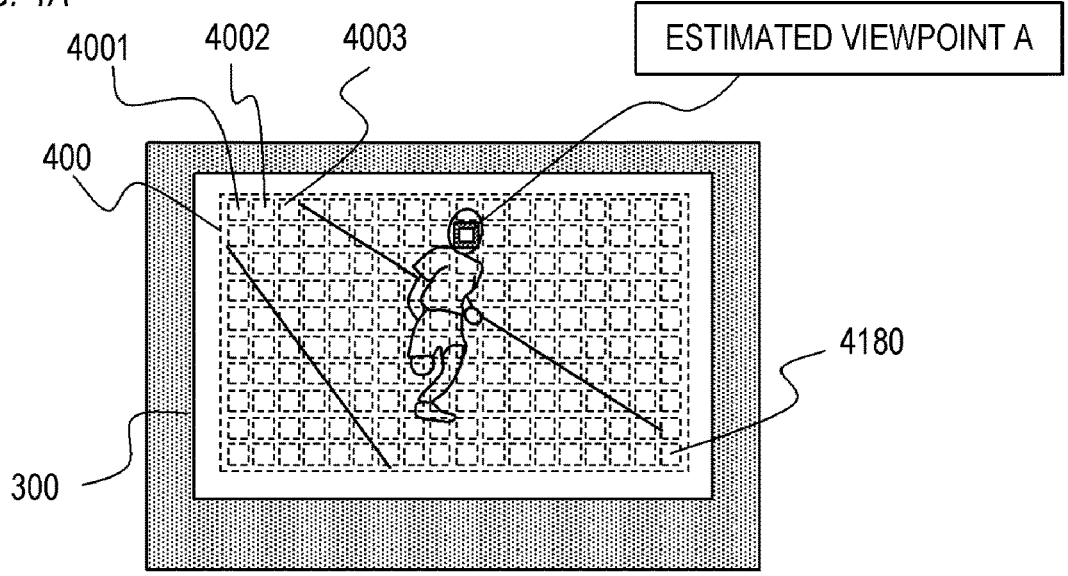
FIGS. 4A to 4C are diagrams depicting a visual field in a finder according to Embodiment 1.

FIG. 4A is a diagram depicting a visual field in a finder, and indicates a state where the display device 10 is operated. In FIG. 4A, 300 indicates a view field mask, 400 indicates a focus-detecting region, and 4001 to 4180 indicates 180 distance-measuring point indices, which are at positions on the imaging plane, and are superimposed on a through image indicated on the display device 10. Out of the indices, an index corresponding to the current estimated gaze point position appears as a frame (e.g. estimated gaze point A in FIG. 4A) in the display.

Description on Line-of-Sight Detecting Operation

A line-of-sight detecting method and a blinking detecting method according to Embodiment 1 will be described with reference to FIGS. 5, 6A, 6B and 7.

Figure 5:
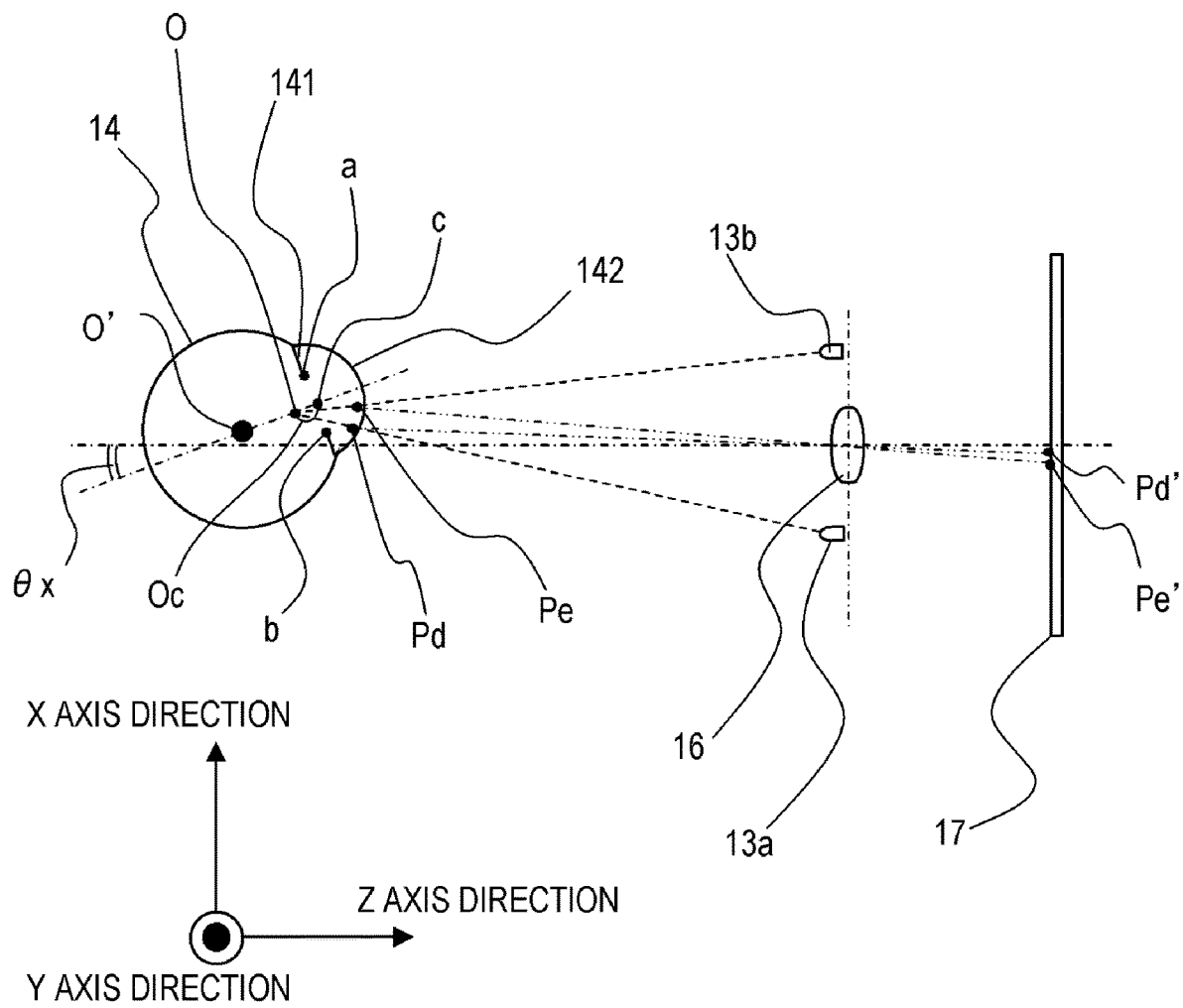
FIG. 5 is a diagram for explaining a principle of a line-of-sight detecting method according to Embodiment 1.

FIG. 5 is a diagram for explaining the principle of the line-of-sight detecting method, and corresponds to a summary diagram of the above mentioned optical system to detect the line-of-sight illustrated in FIG. 1. In FIGS. 5, 13a and 13b indicate light sources (e.g. light-emitting diodes) that emit infrared light (invisible) to the user, and each light source is disposed approximately at symmetric positions with respect to the optical axis of the light-receiving lens 16, and illuminate the eyeball 14 of the user. A part of the illuminating light reflecting by the eyeball 14 is collected on the eyeball image pickup element 17 by the light-receiving lens 16.

Figure 6A:
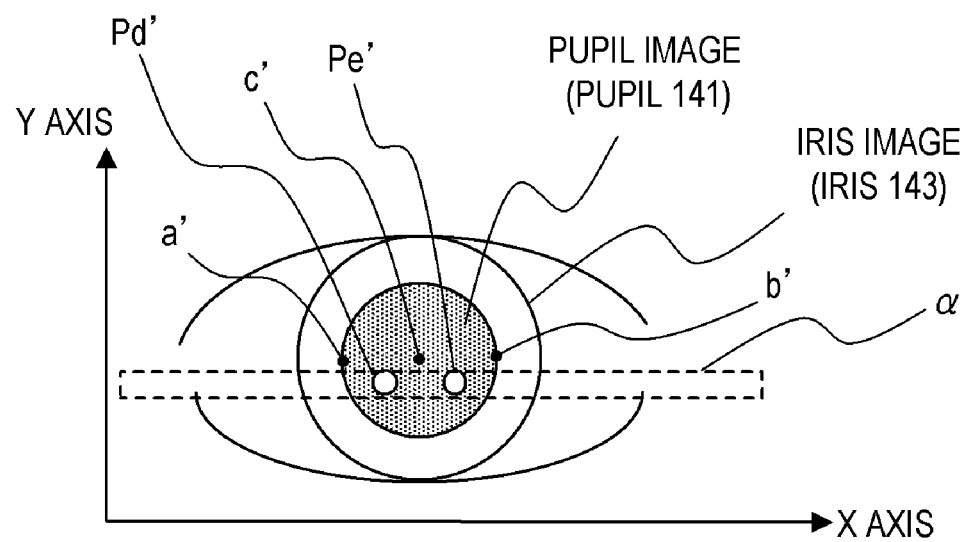
FIG. 6A is a diagram depicting an eye image according to Embodiment 1.
Figure 6B:
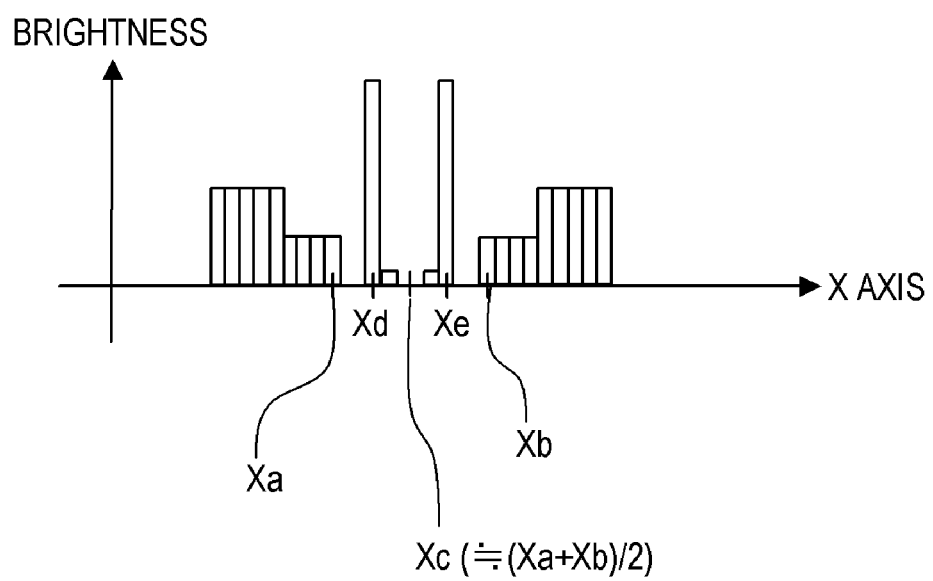
FIG. 6B is a diagram depicting a brightness distribution of the eye image according to Embodiment 1.

FIG. 6A is a schematic diagram depicting an eye image projected onto the eyeball image pickup element 17 (eyeball image captured by the eyeball image pickup element 17), and FIG. 6B is a diagram depicting the output intensity of the CCD of the eyeball image pickup element 17.

Figure 7:
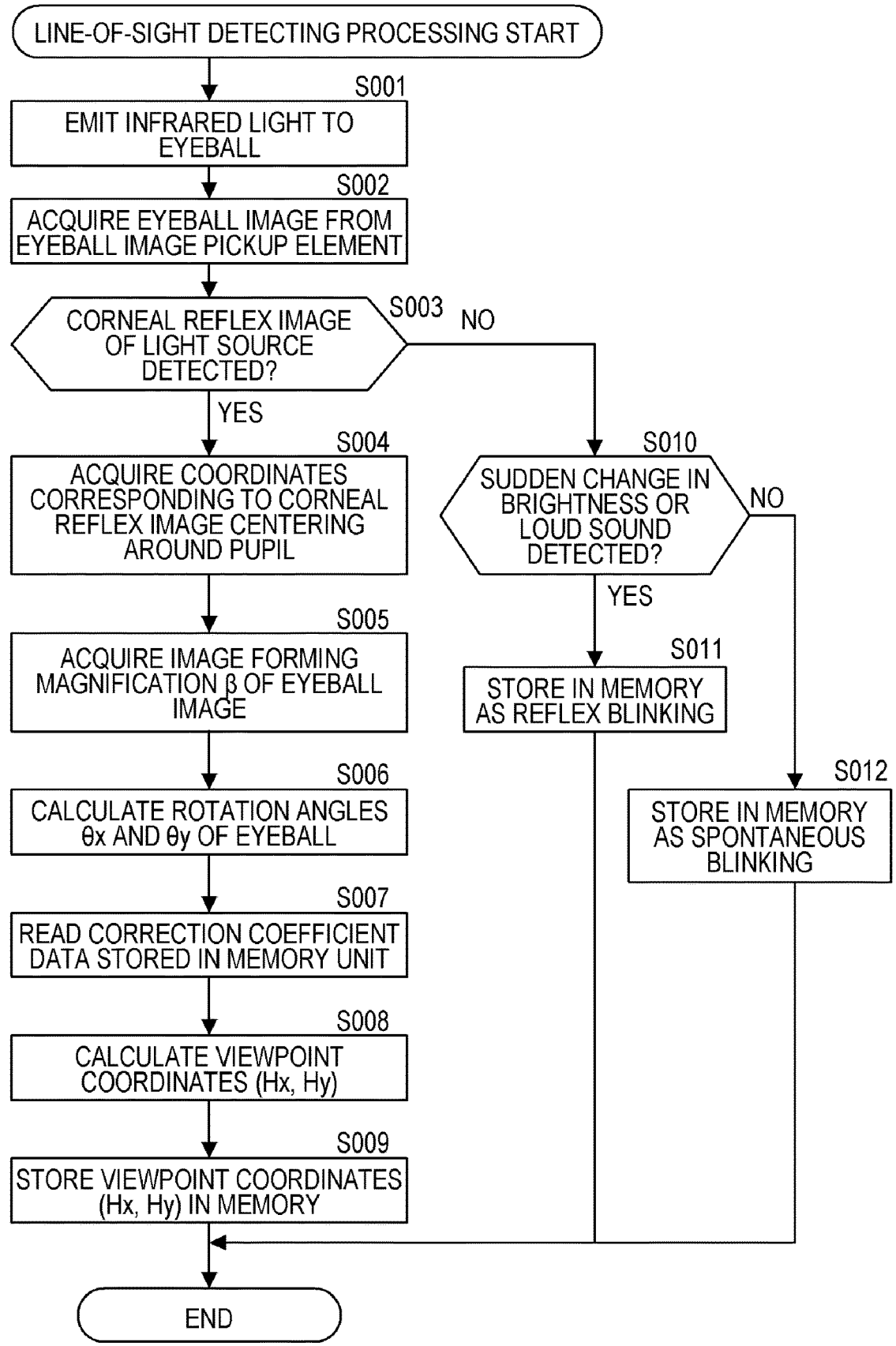
FIG. 7 is a flow chart of a line-of-sight detecting operation according to Embodiment 1.

FIG. 7 is a schematic flow chart of the line-of-sight detecting operation according to Embodiment 1. In FIG. 7, the line-of-sight detecting method and blinking detection determining method will be described.

In step S001, the light sources 13a and 13b emit the infrared light onto the eyeball 14 of the user. The eyeball image of the user illuminated by the infrared light is formed on the eyeball image pickup element 17 via the light-receiving lens 16, and is photo-electrically converted by the eyeball image pickup element 17. Thereby the eyeball image can be processed as an electric signal.

In step S002, the eye image (eye image signal; electric signal of eye image) acquired from the eyeball image pickup element 17 is sent to the CPU 3.

In step S003, the CPU 3 determines whether the corneal reflex images Pd and Pe of the light sources 13a and 13b indicate din FIG. 5 are detected. Processing advances to step S004 if the corneal reflex images Pd and Pe are detected, or to step S010 if not detected. In other words, the CPU 3 is a line-of-sight detecting unit that detects the viewpoint position of the user with respect to the display unit (display device 10), and is also a detecting unit that detects the closed state of the eyelid of the user. In the case where the viewpoint position is not detected (conical reflex images Pd and Pe are not detected), the CPU 3 detects the closed state of the eyelid (blinking). The method for detecting blinking is not limited to this but may be another method, such as detecting blinking by the change in the surface temperature of the eyeball, or detecting blinking by image recognition.

In step S004, from the eye image acquired in S002, the CPU 3 determines the coordinates of points corresponding to the corneal reflex images Pd and Pe of the light sources 13a and 13b, and the point corresponding to the pupil center c, indicated in FIG. 5. The infrared light emitted from the light sources 13a and 13b illuminates a cornea 142 of the eyeball 14 of the user. At this time, the corneal reflex images Pd and Pe formed by a part of the infrared light reflected on the surface of the cornea 142 are collected by the light-receiving lens 16, and form images on the eyeball image pickup element 17 (points Pd' and Pe' in FIG. 5). In the same manner, the luminous fluxes from the edges a and b of the pupil 141 also form images on the eyeball image pickup element 17.

FIG. 6B indicates brightness information (brightness distribution) on a region a in the eye image in FIG. 6A acquired from the eyeball image pickup element 17. FIG. 6B indicates the brightness distribution in the X axis direction when the horizontal direction of the eye image is the X axis direction, and the vertical direction of the eye image is the Y axis direction. Here it is assumed that the coordinates of the images Pd' and Pe', formed by the corneal reflex images of the light sources 13a and 13b, in the X axis direction (horizontal direction) are Xd and Xe. It is also assumed that the coordinates of the images a' and b', formed by the luminous fluxes from the edges a and b of the pupil 14b, in the X axis direction are Xa and Xb. In the brightness information example in FIG. 6B, an extremely high level of brightness is acquired at the positions Xd and Xe, which correspond to the images Pd' and Pe' formed by the corneal reflex images of the light sources 13a and 13b. In the region from the coordinates Xa to Xb, which corresponds to the region of the pupil 141, an extremely low level of brightness is acquired except for the positions Xd and Xe mentioned above. On the other hand, in a region having an X coordinate value lower than Xa and a region having an X coordinate value higher than Xb, which correspond to the regions of the iris 143 outside the pupil 141, intermediate values between the above mentioned two types of brightness levels are acquired. Based on this information on the changes of the brightness level with respect to the X coordinate position, the X coordinates Xd and Xe of the images Pd' and Pe' formed by the corneal reflex images of the light sources 13a and 13b, and the X coordinates Xa and Xb of the images a' and b' at the edges of the pupil, can be acquired. In a case where the rotation angle θx of the optical axis of the eyeball 14 with respect to the optical axis of the light-receiving lens 16 is small, the coordinate Xc of the location (c') corresponding to the pupil center c imaged on the eyeball image pickup element 17, can be expressed as Xc≈(Xa+Xb)/2. As described above, the X coordinate of c', which corresponds to the pupil center imaged on the eyeball image pickup element 17, and the coordinates of the corneal reflex images Pd' and Pe' of the light sources 13a and 13b, can be estimated.

In step S005, the CPU 3 calculates the image forming magnification 13 of the eyeball image. β is a magnification determined by the position of the eyeball 14 with respect to the light-receiving lens 16, and can be determined as a function of the distance (Xd−Xe) of the corneal reflex images Pd' and Pe'.

In step S006, the CPU 3 calculates the rotation angle of the optical axis of the eyeball 14 with respect to the optical axis of the light-receiving lens 16. The X coordinate of the mid-point between the corneal reflex images Pd and Pe and the X coordinate of the center of curvature O of the cornea 142 approximately match. Therefore, if the standard distance from the center of curvature O of the cornea 142 to the center c of the pupil 141 is Oc, the rotation angle θx of the optical axis of the eyeball 14 on the Z-X plane can be calculated using the following Expression 1. The rotation angle θy in the case where the eyeball of the user rotates on a plane vertical to the X axis can also be calculated using the same method in the case of the rotation angle θx.

$$\beta \times Oc \times \text{SIN } \theta x \approx \{(Xd+Xe)/2\} - Xc \quad \text{(Expression 1)}$$

In step S008, the viewpoint of the user (position directed by the line-of-sight; position which the user is looking at) on the display device 10 is determined using the rotation angles θx and θy calculated in the step S007. If the coordinates (Hx, Hy) of the viewpoint are the coordinates (Hx, Hy) of the center c of the pupil 141 on the display device 10, the coordinates (Hx, Hy) of the viewpoint can be calculated using the following Expressions 2 and 3.

$$Hx = m \times (Ax \times \theta x + Bx) \quad \text{(Expression 2)}$$

$$Hy = m \times (Ay \times \theta y + By) \quad \text{(Expression 3)}$$

The coefficient m of Expressions 2 and 3 is a constant that is determined by the configuration of the finder optical system of the camera, and is a conversion coefficient to convert the rotation angles θx and θy into positional coordinates corresponding to the center c of the pupil 141 on the display device 10. The coefficient m is assumed to be determined and recorded in the memory unit 4 in advance, and is read from the memory unit 4 in step S007. Ax, Bx, Ay and By are line-of-sight correction coefficients to correct the difference of the line-of-sight of the user depending on the individual. These line-of-sight correction coefficients are assumed to be acquired by the calibration operation described later, and recorded in the memory unit 4 before starting the line-of-sight detecting routine.

In step S009, the CPU 3 records the coordinates (Hx, Hy) of the viewpoint in the memory unit 4. Thus the line-of-sight detecting routine ends in the case where blinking is not detected.

In the case where blinking is detected in step S003, on the other hand, processing advances to step S010, and the type of the blinking is determined. Here there are three types of blinking by the user: reflex blinking caused by external stimuli (e.g. sound, light); spontaneous blinking in which the eyelid closes unconsciously regardless the external stimuli; and voluntary blinking in which the eyelid is closed consciously. The blinking time tends to be longer in the spontaneous blinking than in the reflex blinking, and longer in the voluntary blinking than in the spontaneous blinking. Therefore, by determining the type of blinking and switching the power saving period in accordance with the type of blinking, the power saving processing can be performed with minimal discomfort to the user. Furthermore, the blinking time tends to be longer in the voluntary blinking than in the spontaneous blinking, hence in the case of the voluntary blinking, the user will not experience much discomfort even if the same power saving period as the case of the spontaneous blinking is used. Therefore, in Embodiment 1, it is determined by the CPU 3 whether the type of blinking is the reflex blinking or the spontaneous blinking, and the type of blinking is recorded in the memory unit 4.

In step S010, the CPU 3 determines whether the blinking (closed state of the eyelid) detected in step S003 is the reflex blinking or the spontaneous blinking. Here the CPU 3 may determine the type of blinking depending on whether a sudden change in brightness or a loud sound was detected in the previous frame of the frame where the blinking in step S003 was detected. The detection of the change in brightness or detecting of a loud sound may occur in the previous frame of the frame where blinking was detected or in a neighboring frame thereof. The neighboring frame may be a frame several frames (number is arbitrary) before or after the frame where the CPU 3 detected the blinking, for example. The change in brightness may be determined, for example, using a difference between the brightness value in the frame where the blinking was detected and the brightness value in the previous or neighboring frame thereof. The difference between the brightness values may be determined by comparing the respective average brightness values of the entire image, or by comparing the brightness values in a specific region (e.g. center portion of the image), or by another method. The loud sound may be determined, for example, depending on whether the voice input unit 210 acquired a predetermined level or louder sound volume in the previous or neighboring frame. The above methods of determining the change in brightness or the loud sound are examples, and other arbitrary methods may be used. In Embodiment 1, processing advances to step S011 if at least one of the change in brightness and the loud sound is detected, or to step S012 if neither the change in brightness nor the loud sound is detected.

In step S011, the CPU 3 records the blinking detected in step S003 in the memory unit 4 as the reflex blinking, and ends the line-of-sight detecting routine.

In step S012, the CPU 3 records the blinking detected in step S003 in the memory unit 4 as the spontaneous blinking, and ends the line-of-sight detecting routine.

The above is the viewpoint coordinate acquiring method on the display device 10 using the corneal reflex images of the light sources 13a and 13b, but the method for acquiring the viewpoint coordinates is not limited to this, and the present invention is applicable to any method as long as the eyeball rotation angle is acquired from the captured eye image.

Calibration Operation

Figure 4B:
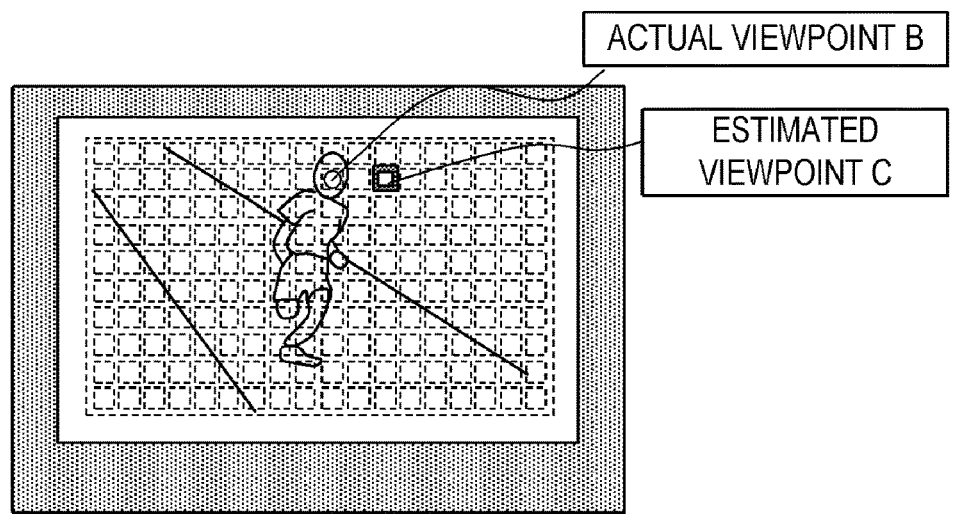

In the above mentioned line-of-sight detecting routine, the rotation angles θx and θy of the eyeball are acquired from the eye image, and the viewpoint position is estimated by converting coordinates from the pupil center position to the corresponding position on the display device 10. However, the viewpoint may not be estimated accurately in some cases due to such factors as the difference in eyeball shape depending on the individual. Specifically, as indicated in FIG. 4B, the actual viewpoint B of a user and the estimated position of the viewpoint C deviate unless the values of the line-of-sight correction coefficients Ax, Ay, Bx and By are corrected to appropriate values for the user. In FIG. 4B, the user is gazing at a person at position B, but the camera side estimates this as gazing at the background in error, hence in this state, appropriate focus detection and adjustment cannot be performed. Therefore, before capturing an image by the camera, it is necessary to perform the calibration operation to acquire values of the correction coefficients appropriate for the user, and store these values in the digital still camera 1.

Figure 4C:
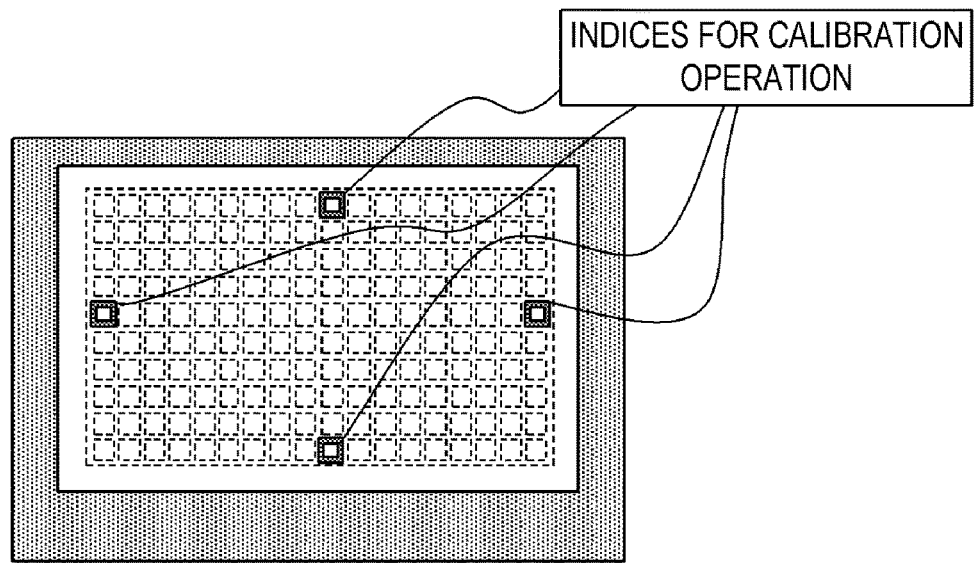

Conventionally the calibration operation is performed by highlighting a plurality of different indices located at the positions indicated in FIG. 4C, for example, inside the visual field of the finder before capturing an image, and having the user look at these indices. A publicly known technique is performing the line-of-sight detecting routine when the user is gazing at each index, and determining the line-of-sight correction coefficients appropriately for the user based on the calculated plurality of viewpoints (estimated positions) and coordinates of each index. The method for displaying the indices is not especially limited, as long as the positions for the user to look at are indicated, and graphics to be the indices may be displayed or the indices may be displayed by changing the brightness or color in the image (e.g. captured image).

Here the CPU 3 may measure the blinking time of the user in the line-of-sight detecting routine performed during the calibration. In other words, the CPU 3 plays the function as the blinking time measuring unit. For example, the spontaneous blinking time may be measured using the time, from the CPU 3 detecting blinking (state where corneal reflex image is not detected) in step S003 and advancing the processing to step S010, to the CPU 3 executing the processing step S004 in the line-of-sight detecting routine. Further, the reflex blinking time may be measured using the blinking time detected when the brightness of the image displayed on the display device 10 is suddenly changed from light to dark (or from dark to light) during calibration. In this way, the CPU 3 determines the type of blinking of the user and measures the blinking time of the user depending on the type of blinking. In Embodiment 1, the CPU 3 measures the blinking time during calibration, but the CPU 3 may measure the blinking time when needed during image capturing. In the case where the blinking time is measured for a plurality of times, an average value thereof may be regarded as the blinking time of the user, or a blinking time just measured may be regarded as the blinking time of the user.

The power saving processing when the CPU 3 detected blinking will be described with reference to FIGS. 8, 9A to 9C and 10.

Blinking Power Saving Processing Flow

Figure 8:
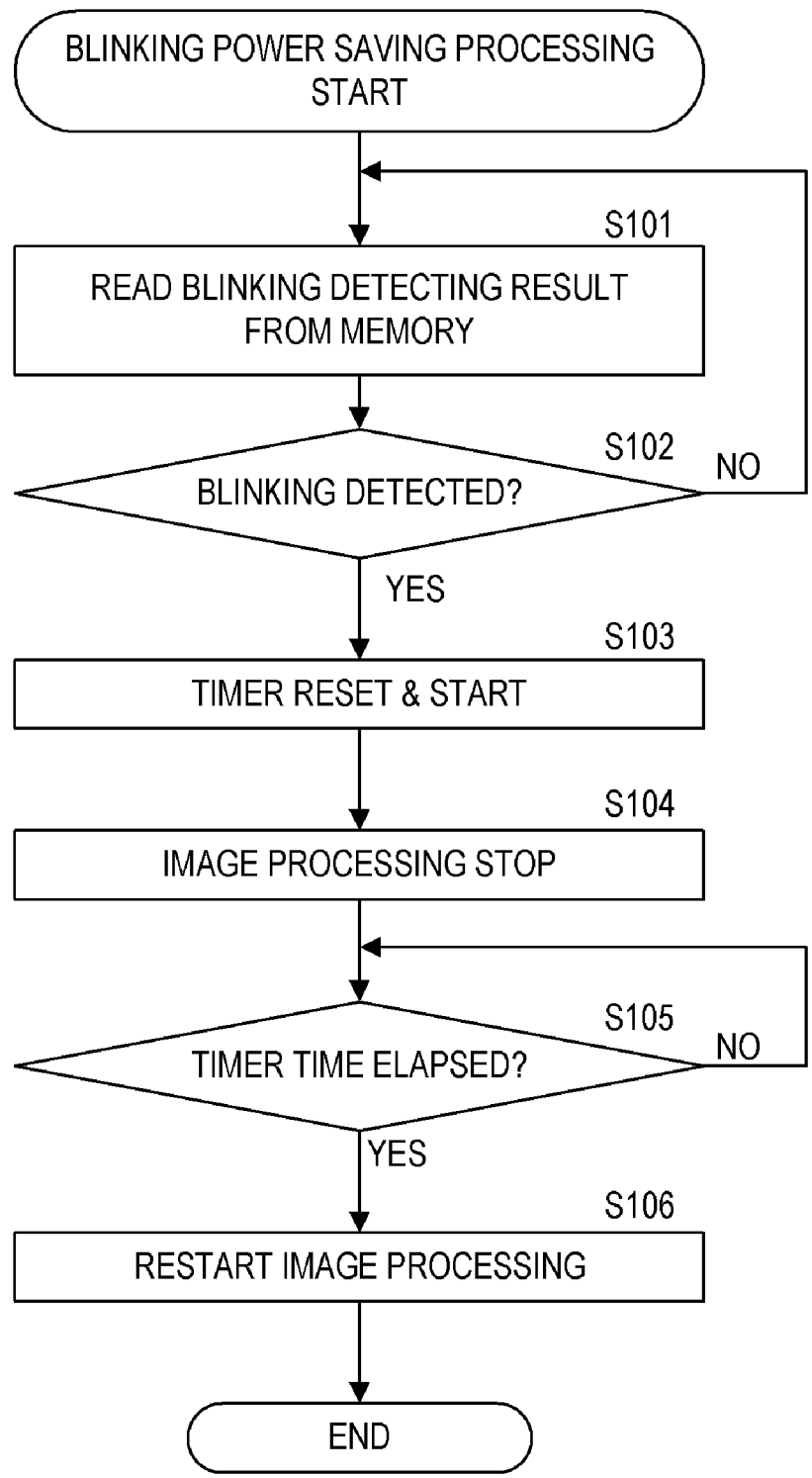
FIG. 8 is a flow chart of blinking power saving processing according to Embodiment 1.

FIG. 8 is a flow chart depicting a processing flow which is repeatedly executed in the digital still camera 1. In FIG. 8, a flow in a case where the CPU 3 (control unit) stops processing of the image processing circuit 209 and changes the power saving period to perform the power saving processing in accordance with the type of blinking will be described as an example of power saving processing to reduce power consumption. Here an example of performing the power saving processing for the image processing circuit 209 will be described, but the CPU 3 may control so as to perform power saving processing for the display device 10, or perform power saving processing for both the image processing circuit 209 and the display device 10.

In step S101, from the memory unit 4, the CPU 3 reads the blinking detection result in step S011 or step S012 in the line-of-sight detecting routine.

In step S102, the CPU 3 determines whether blinking was detected based on the read result in step S101. Processing advances to step S103 if "Blinking: Yes", or returns to step S101 if "Blinking: No".

In step S103, the CPU 3 writes "Blinking: No" as the blinking detection result in the memory unit 4. This is to prevent that "Blinking: Yes" is determined in the next repeat processing. The CPU 3 outputs an instruction to stop processing of the image processing circuit 209, and initializes the timer for determining the blinking end timing, and starts the timer. In other words, the CPU 3 instructs the image processing circuit 209 to start the power saving processing in response to the detection of the eyelid closed state. In step S103, based on the type of the blinking stored in the memory unit 4 in step S011 or step S012, the CPU 3 also determines which, reflex blinking time or spontaneous blinking time, out of the predetermined blinking times, is used. Here the blinking time of the reflex blinking (case where the CPU 3 detects a sudden change in brightness or sound) is shorter than the blinking time of the spontaneous blinking time. Therefore, it is preferable to set the power saving period in the case of the reflex blinking to be shorter than the case of the spontaneous blinking. Thus in Embodiment 1, the power saving period is determined considering the blinking time in accordance with the type of blinking. Thereby the power saving processing can be performed within a time matching with the type of blinking, and discomfort to the user can be minimized. For the blinking time of the user used for calculating the power saving period, it is preferable that the blinking time (measured value) of each user, which is measured during calibration or the like, is used, but a standard blinking time (fixed value) recorded in the memory unit 4 or the like in advance may be used.

In step S104, the image processing circuit 209 stops processing in accordance with the instruction to start power saving processing, which was outputted in step S103. As mentioned above, the content of the power saving processing is not limited to this.

In step S105, based on the value of the time for determining the blinking end timing, the CPU 3 determines whether the power saving time (specific time) of the image processing circuit 209 has elapsed since the CPU 3 detected blinking. If the power saving period has elapsed, the CPU 3 instructs to restart the image processing circuit 209 to restart the processing, and processing advances to S106. If the power saving period has not yet elapsed, processing returns to S105, that is, the CPU 3 waits until the power saving period elapses. The power saving period here is preferably based on the time determined by subtracting the time, required from clearing the power saving processing to restarting the processing of the image processing circuit 209, from the predetermined blinking time of the user. In other words, after the power saving processing is started in the image processing circuit 209, the CPU 3 instructs the image processing circuit 209 to restart processing such that the image processed after the restart by the image processing circuit 209 is displayed on the display device 10 before the blinking of the user ends. Thereby a new image is displayed on the display device 10 at a timing when the user opened their eyelid, and discomfort caused by the state where the power saving processing is continued (image is not displayed) when the blinking ends can be minimized.

In step S106, in accordance with the instruction to restart processing outputted in step S105, the image processing circuit 209 restarts image processing to display the image on the display device 10. In FIG. 8, the power saving processing flow of the image processing circuit 209 was described, but the same blinking power saving processing can be applied to the power saving processing of the display device 10 in the same manner. Here the power saving period may be determined considering the time required for restarting the processing by the display device 10. In other words, after the power saving processing is started to the display device 10, the CPU 3 instructs the display device 10 to restart processing such that the image processed by the image processing circuit 209 is displayed on the display device 10 before the blinking of the user ends.

Display Example of Blinking Power Saving Processing

FIGS. 9A and 9B indicate LV images at time series timings T1 to T7, and the eye images of the user for each frame, assuming the case of photographing during a foot race. FIG. 9A indicates LV images displayed on the display device 10, FIG. 9B indicates the eye images of the user that are formed on the eyeball image pickup element 17, and FIG. 9C indicates a state of an eyelid of the user and processing content of the digital still camera 1 at each timing. At timings T1 and T7, the eyelid of the user is open, and at timings T2 to T6 the eyelid of the user is closed, that is, the user is blinking. A plurality of frames present between the timings T4 and T5.

The power saving processing when the CPU 3 detected blinking will be described next with reference to FIGS. 9A to 9C. In FIGS. 9A to 9C, processing in the case where the image processing circuit 209 and the display device 10 are stopped will be described as an example of the power saving processing. The content of the power saving processing is merely an example, and the power saving processing is not limited to this. In the processing of the image processing circuit 209 and the processing of the display device 10 in FIG. 9C, the power saving processing is indicated as "power saving ON", and the non-power saving processing (normal time) is indicated as "power saving OFF". For the blinking time, it is assumed that a measured value of each user is used.

At timing T1, the CPU 3 does not detect blinking, hence image processing is performed as a processing performed during power saving OFF, and an LV image is displayed on the display device 10.

At time T2, the eyelid closed state is imaged on the eyeball image pickup element 17, but the CPU 3 has not yet detected blinking. Hence at timing T2, the CPU 3 does not yet output an instruction for the power saving processing, and the image processing and the LV display are being performed.

At timing T3, the CPU 3 detects blinking in the image of the eye at timing T2, and outputs an instruction to start power saving processing (power saving ON) to the image processing circuit 209 and the display device 10 (corresponds to step S103 in FIG. 8). At timing T3, which is a timing before the instruction to perform the power saving processing is reflected, the image processing and LV display are being performed. In other words, T3 and T4 indicate the time lag from the CPU 3 detecting the blinking to the start of power saving processing.

At timing T4, the power saving processing starts in the image processing circuit 209 and the display device 10. In other words, the image processing circuit 209 stops image processing (corresponds to step S104 in FIG. 8), and the display device 10 stops and displays nothing.

Here in FIGS. 9A to 9C, the CPU 3 restarts the LV display when the blinking of the user ends (timing T7). Therefore, to be in time for timing T7, the CPU 3 resets the power saving processing (power saving OFF) and outputs the instruction to start normal processing, considering the time lag required for restarting processing of the image processing circuit 209 and the display device 10. The time lag of the image processing circuit 209 to be considered is preferably the time required from the timing when the image processing circuit 209 restarts the processing to the timing when the processed image is displayed on the display device 10. The time lag of the display device 10 to be considered is preferably the time required from the timing when the display device 10 restarts processing to the timing when the image is displayed.

Timing T5 is a timing when the time, determined by subtracting the time lag of the image processing circuit 209 from the blinking time of the user, has elapsed since the time when the CPU 3 detected the blinking (step S105: "Yes" in FIG. 8). Therefore, the CPU 3 outputs the instruction to the image processing circuit 209 to clear the power saving processing and restart the image processing.

Timing T6 is a timing when the time, determined by subtracting the time lag of the display device 10 from the blinking time of the user, has elapsed since the time when the CPU 3 detected the blinking. Therefore, the CPU 3 outputs the instruction to the display device 10 to clear the power saving processing and to restart the display. Further, at timing T6, the image processing circuit 209 receives the instruction to restart the processing outputted at timing T5, and restarts the image processing (corresponds to step S106 in FIG. 8). From timing T4 to T6, the display device 10 is in power saving processing, hence the display device 10 stops and displays nothing.

At timing T7, the user opens their eyelid and the display device 10 restarts normal processing. At timing T7, the power saving processing is cleared in the image processing circuit 209 and the display device 10, and the image processed by the image processing circuit 209 is LV-displayed. FIGS. 9A to 9C indicate an example of restarting the LV display at the timing when the user opens their eyelid, but the CPU 3 may output the instruction to restart processing so that LV display is restarted at several frames (margins) before the user opens their eyelid. The power saving period in this case may be the time determined by subtracting the time lag required for restarting the processing and several frames (margins) from the blinking time, for example, or may be the time determined by subtracting the time lag required for restarting the processing from a blinking time which is set to be slightly shorter than the actual blinking time in advance. In some cases, the actual blinking time of a user may be longer than an average blinking time, but if the power saving period is set like this, the LV display can be restarted before the user opens their eyelid with more certainty. However, in order to minimize the discomfort that the user may experience in such a case, the power saving processing indicated in FIG. 10 (described in detail later), where the image processing circuit 209 is stopped and the display device 10 is not stopped, may be used, for example.

As mentioned above, a difference time may be set to each power saving period (period in which the processing that is set is actually reflected) considering the processing time of each component. For example, in FIGS. 9A to 9C, the image processing circuit 209 receives the instruction to start the power saving processing at timing T3, and receives the instruction to clear the power saving processing at timing T5, hence the power saving period is the time between timings T4 and T5. On the other hand, the display device 10 (display device driving circuit 11) receives the instruction to start the power saving processing at timing T4, and receives the instruction to clear the power saving processing at timing T6, hence the power saving period is the time between timings T4 and T6. The image processing circuit 209 first clears the power saving processing like this because the power saving period of the image processing circuit 209 is determined, considering the time required for the display device 10 to display the processed image. Further, the frame timings of the image pickup element 2 and the display device 10 are not always the same, hence the power saving periods thereof may differ. In the case where the time required from clearing of the power saving processing to restarting the processing is different between the image pickup element 2 and the display device 10 because of the frame rate thereof, the CPU 3 may output the instruction to restart processing in accordance with the respective frame rate so as to be in time for the timing to restart the LV display.

Example of Power Saving Processing

The content of the power saving processing is not limited to the above. For example, in the power saving processing of the image processing circuit 209, the CPU 3 may control to stop the image processing circuit 209 or to reduce the frame rate thereof in the period between T4 to T6. In the case where the image processing circuit 209 performs a plurality of types of processing, the CPU 3 may control to perform power saving processing only for processing related to display in the image processing circuit 209.

For the power saving processing of the display device 10 as well, power saving processing different from the description in FIGS. 9A to 9C may be used. For example, the CPU 3 may control, for example, to stop the driving of the display device 10, or to reduce the frame rate of the display device 10, or to display a black image. Further, the CPU 3 may control, for example, to reduce the frame rate of the display device 10 as well where the processing to reduce the frame rate is performed by the power saving processing of the image processing circuit 209.

While the image processing circuit is being stopped by the power saving processing of the image processing circuit 209, the display device 10 may display a black image, or may display a frame image of the timing when the blinking was detected (last frame image processed before the power saving started). For example, in a case where a blinking time of the user is shorter than the time measured at the calibration, if a black image is being displayed by the power saving processing of the display device 10, the black image may still be displayed at the timing when the user opened their eyelid, which the user may view as flickering. In such a case, the frame image of the timing when the blinking was detected is displayed, for example, then the generation of flickering can be prevented even if the blinking time is shorter than expected. The image displayed here may be an image at a timing when the CPU 3 detected the blinking, or may be an image immediately before the blinking was detected, or may be an image that is estimated as an image that the user was viewing immediately before the blinking, considering the time lag until the detection of the blinking.

Figure 10:
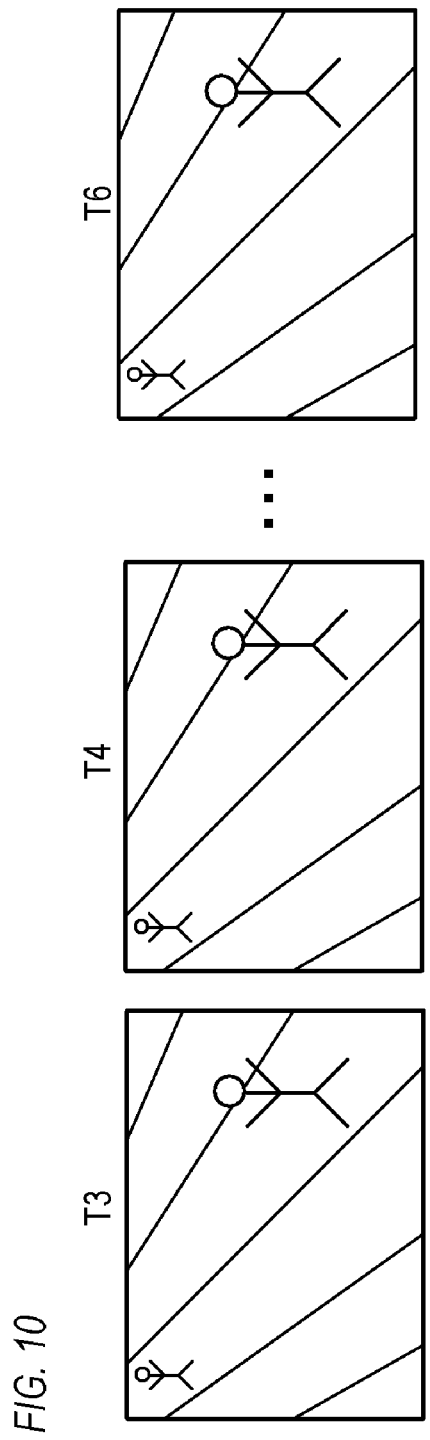
FIG. 10 indicates LV images during blinking power saving time according to Embodiment 1.

FIG. 10 exemplifies LV images which are displayed on the display device 10 at timings T3 to T6 in FIG. 9A. In FIG. 10, the power saving processing to stop the image processing circuit 209 is performed (timings T4 to T5), and while an image to be displayed on the display device 10 after the processing restarts is being processed (timing T6), the frame image at timing T3 when the CPU 3 detected the blinking is displayed. This way the generation of flickering can be suppressed with more certainty, even if the power saving effect decreases compared with the case of stopping the display device 10 (FIGS. 9A to 9C). While the power saving processing to stop the image processing circuit 209 is being performed, the CPU 3 may control to change the display method of the display device 10 when the threshold time is reached. For example, the CPU 3 may control to display a black image or to stop the display device 10 from stopping of the image processing circuit 209 (immediately after detection of blinking) to the threshold time, and to display a frame image of the timing when the blinking was detected after the threshold time has elapsed. Thereby a higher power saving effect can be acquired than the case where the image at the timing when the blinking was detected is constantly displayed during blinking.

The content of the power saving processing may be changed as required. For example, the CPU 3 may change the content of the power saving processing depending on the display mode (frame rate) of EVF. For example, there are three display modes of EVF of which frame rates are different, that is: a smooth display mode (120 fps); an image quality priority display mode (60 fps); and a power saving display mode (30 fps). In the power saving processing executed in each mode, the power saving effect may be increased as the display mode assigns a higher priority to the power saving effect, that is, as the frame rate of the display mode is lowered. For example, it may be set that: the power saving processing is not performed in the smooth display mode; the frame, in which image processing is performed, is thinned out in the image quality priority display mode; and the image processing and display device 10 are stopped in the power saving display mode. Thereby the power saving processing can be performed in accordance with the desired use by the user. Each of the display mode names, values of the frame rates and the content of the power saving processing to be executed are examples, and the power saving processing is not limited to these examples.

The control targets during the power saving period are not limited to the image processing circuit 209 and the display device 10. For example, the CPU 3 may control so as to reduce the power consumption of the image pickup element 2, the photometric circuit 202, the recognition circuit 208, the tracking circuit 207, the automatic focus detecting circuit 203, and the like. By performing power saving processing for these elements and circuits as well, an even higher power saving effect can be implemented. In any of these cases, it is preferable to determine the power saving period such that the image after restarting the processing is displayed on the display device 10 when the user opens their eyelid. The CPU 3 may change the content of the power saving processing in accordance with the operation mode of the camera. Here the operation modes of the camera are: a non-photographing state, a photographing preparation state, and a photographing state. The non-photographing state is a state where the LV image is displayed on the display device 10, and the release button 5 is not pressed. The photographing preparation state is a state where AF is being focused before photographing, and the release button 5 is half-depressed. And the photographing state is a state where a still image is being photographed, and the release button 5 is depressed. In the photographing state (during consecutive shooting), the still image need be photographed even if the user blinks. Therefore, the blinking power saving processing is preferably applied to the non-photographing state and to the photographing preparation state. For example, the non-photographing state includes a non-photographing non-AF mode, in which auto focus (AF) is not performed when photographing is not performed. In the non-photographing non-AF mode, the image pickup element 2, the photometric circuit 202, the recognition circuit 208, the tracking circuit 207, and the automatic focus detecting circuit 203 may be controlled to stop or to be skipped.

By changing the power saving processing depending on the display mode and the operation mode like this, the power saving processing can be performed in accordance with the desired use by the user. The power saving processing in each mode is not limited to the processing described above, and the content of the power saving processing may be changed or combined.

As described above, according to the present embodiment, blinking is detected and processing is restarted considering the blinking time and the processing restart time of each circuit. Thereby flickering of the display image can be minimized while reducing the power consumption.

Modification

In Embodiment 1, an example of measuring the blinking time of a user and calculating the power saving period using the blinking time of each user was described, but an average blinking time may be recorded in the memory unit 4 or the like, for example, so as to calculate the power saving period using the blinking time recorded in advance. In this case, it is preferable to set the power saving period also considering the time lag from the generation of blinking of the user to the detection of the blinking by the CPU 3. Further, in Embodiment 1, an example of determining the type of blinking and using a different power saving period for each type of blinking was described, but the same blinking time may be used regardless the type of blinking. In the case of using the same blinking time regardless the type of blinking, the processing to determine the type of blinking (steps S010 to S012) is unnecessary. Thereby power saving processing can be performed by simpler processing steps.

According to various embodiments of the present disclosure, flickering of the display image can be minimized while reducing the power consumption.

Other Embodiments

While example embodiments have been described, the present invention is not limited to these specific embodiments, and various modes within a scope not departing from the spirit of the disclosure are also included in the present invention. Parts of the embodiments described above may be combined as necessary.

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-096150, filed on Jun. 8, 2021, which is hereby incorporated by reference herein in its entirety.

What is claimed is:

1. A display device comprising at least one memory and at least one processor which function as:
   an image acquiring unit configured to acquire time series images;
   an image processing unit configured to process the images acquired by the image acquiring unit;
   a display control unit configured to perform control so that a processed image processed by the image processing unit is displayed on a display;
   a detecting unit configured to detect a closed state of an eyelid of a user;
   a control unit configured to start power saving processing to reduce power consumption of the image processing unit or the display, in response to the detection of the closed state of the eyelid by the detecting unit, and instruct restart of processing that was being performed before the power saving processing, in the image processing unit or the display, at a timing when a specific predetermined time period has elapsed since the time of the detection of the closed state of the eyelid; and a blinking time measuring unit configured to measure a blinking time duration of the user, a blinking time duration of the user used for calculating the specific predetermined time period, wherein the blinking time measuring unit measures a blinking time duration of the user for each of a plurality of types of blinking, the blinking time measuring unit determines a type of blinking from among the plurality of types of blinking, based on whether a sudden change in brightness or sound is detected in an immediately preceding or neighboring frame of a frame where the closed state of the eyelid is detected, and the blinking time duration of the user used for calculating the specific predetermined time period is based on the blinking time duration corresponding to the determined type of the blinking.

2. The display device according to claim 1, wherein the specific predetermined time period is based on a predetermined blinking time duration of the user.

3. The display device according to claim 1, wherein the specific predetermined time period is based on a time period determined by subtracting, from the predetermined blinking time duration of the user, a time period that is required from clearing of the power saving processing until the restart of the processing in the image processing unit or the display.

4. The display device according to claim 1, wherein after starting the power saving processing to the display, the control unit instructs the display to restart the processing so that the processed image is displayed on the display before the blinking of the user ends.

5. The display device according to claim 1, wherein in the power saving processing, the control unit stops the display or reduces a frame rate of the display.

6. The display device according to claim 1, wherein after starting the power saving processing to the image processing unit, the control unit instructs the image processing unit to restart the processing so that an image processed after the image processing unit restarted the processing is displayed on the display before the blinking of the user ends.

7. The display device according to claim 1, wherein in the power saving processing, the control unit stops the image processing unit or reduces a frame rate of the image processing unit.

8. The display device according to claim 6, wherein while the image processing unit is stopped by the power saving processing to the image processing unit, the display displays a black image or a frame image of the time when the closed state of the eyelid was detected.

9. The display device according to claim 6, wherein while the image processing unit is stopped by the power saving processing to the image processing unit, (i) the display displays a black image from the time of the stopping of the image processing unit until elapsing of a threshold time, and, (ii) after the threshold time has elapsed, the display displays a frame image of the time when the closed state of the eyelid was detected.

10. The display device according to claim 1, wherein the control unit changes a content of the power saving processing in accordance with a frame rate of the display.

11. The display device according to claim 1, wherein the at least one memory and the at least one processing further function as a gaze detecting unit configured to detect a gaze position of the user with respect to the display, and the detecting unit detects the closed state of the eyelid in a case where the gaze detecting unit does not detect the gaze position.

12. The display device according to claim 1, wherein the at least one memory and the at least one processor further function as:

a gaze detecting unit configured to detect a gaze position of the user with respect to the display; and a calibration unit configured to perform calibration of the gaze detecting unit, and the blinking time measuring unit measures the blinking time duration of the user when the calibration unit performs the calibration.

13. The display device according to claim 1, wherein the blinking time duration of the user used for calculating the specific predetermined time period in a case where the blinking time measuring unit detected a sudden change in the brightness or sound is shorter than in other cases.

14. The display device according to claim 1, wherein the image acquiring unit acquires an image of an object from an image sensor.

15. A control method of a display device, comprising:
acquiring time series images;
processing an acquired image;
performing control so that a processed image is displayed on a display;
detecting a closed state of an eyelid of a user;
starting power saving processing to reduce power consumption of the processing or the display, in response to the detection of the closed state of the eyelid by detecting processing;
instructing restart of processing that was being performed before the power saving processing, in the processing or the display, at a timing when a specific predetermined time period has elapsed since the time of the detection of the closed state of the eyelid; and
measuring a blinking time duration of the user for each of a plurality of types of blinking;
determining a type of blinking from among the plurality of types of blinking, based on whether a sudden change in brightness or sound is detected in an immediately preceding or neighboring frame of a frame where the closed state of the eyelid is detected, and
using a blinking time duration of the user for calculating the specific predetermined time period, wherein the blinking time duration of the user is based on the blinking time duration corresponding to the determined type of the blinking.

16. A non-transitory computer readable medium that stores a program, wherein the program causes a computer to execute a control method of a display device, comprising:
acquiring time series images;
processing an acquired image;
performing control so that a processed image is displayed on a display;
detecting a closed state of an eyelid of a user;

starting power saving processing to reduce power consumption of the processing or the display, in response to the detection of the closed state of the eyelid by detecting processing; and instructing restart of processing that was being performed before the power saving processing, in the processing or the display, at a timing when a specific predetermined time period has elapsed since the time of the detection of the closed state of the eyelid, and measuring a blinking time duration of the user for each of a plurality of types of blinking;

determining a type of blinking from among the plurality of types of blinking, based on whether a sudden change in brightness or sound is detected in an immediately preceding or neighboring frame of a frame where the closed state of the eyelid is detected, and using a blinking time duration of the user for calculating the specific predetermined time period, wherein the blinking time duration of the user is based on the blinking time duration corresponding to the determined type of the blinking.

* * * * *